United States Patent [19]

Lamb

[11] 4,132,696
[45] * Jan. 2, 1979

[54] POLYESTER PLASTICIZERS

[75] Inventor: Frank Lamb, Oldham, England

[73] Assignee: Ciba-Geigy AG, Basel, Switzerland

[*] Notice: The portion of the term of this patent subsequent to Dec. 19, 1995, has been disclaimed.

[21] Appl. No.: 732,627

[22] Filed: Oct. 15, 1976

Related U.S. Application Data

[63] Continuation of Ser. No. 559,934, Mar. 19, 1975, abandoned.

[30] Foreign Application Priority Data

Mar. 28, 1974 [GB] United Kingdom ............... 13772/74

[51] Int. Cl.$^2$ ........................ C07C 69/76; C08K 5/11; C08K 5/12; C08L 27/06
[52] U.S. Cl. ................................ 260/31.6; 260/404.8; 560/90; 560/127
[58] Field of Search ................ 260/32.6, 475 P, 404.8; 560/90

[56] References Cited

U.S. PATENT DOCUMENTS

| | | | |
|---|---|---|---|
| 2,914,556 | 11/1959 | Hostettler et al. | 260/475 P |
| 3,169,945 | 2/1965 | Hostettler et al. | 260/475 P |
| 3,331,802 | 7/1967 | Huber et al. | 260/475 P |
| 3,786,011 | 1/1974 | Price et al. | 260/31.6 |
| 3,957,753 | 5/1976 | Hostettler et al. | 260/31.6 |
| 3,972,962 | 8/1976 | Williams et al. | 260/31.6 |

FOREIGN PATENT DOCUMENTS

| | | | |
|---|---|---|---|
| 7016421 | 5/1971 | Netherlands | 260/31.6 |
| 732913 | 6/1955 | United Kingdom | 260/31.6 |
| 859642 | 1/1961 | United Kingdom | 260/31.6 |
| 1137882 | 12/1968 | United Kingdom | 260/31.6 |

OTHER PUBLICATIONS

Koroly et al, *Ind. & Eng. Chemistry*, vol. 45, No. 5, May 1953, pp. 1060–1063.

*Primary Examiner*—Allan Lieberman
*Attorney, Agent, or Firm*—Luther A. R. Hall

[57] ABSTRACT

A random polyester containing residues of aliphatic diols, aromatic dicarboxylic acids and hydroxyacids and being endstopped by monocarboxylic acids are useful plasticizers especially for polyvinyl chloride polymers.

14 Claims, No Drawings

POLYESTER PLASTICIZERS

This is a continuation of application Ser. No. 559,934 filed on Mar. 19, 1975, now abandoned.

The present invention relates to novel plasticisers for thermoplastic polymers such as polyvinyl chloride, and more particularly to plasticisers derived from acid end-stopped polyesters incorporating a lactone as co-reactant.

In British Patent Specification No. 1,289,516 there is claimed a process for the preparation of a substantially primary hydroxyl-terminated linear or branched polyester which has a maximum true melting point of 30° C. containing from 25% by weight to 70% by weight of epsilon-oxycaproyl unit

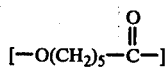

comprising reacting material which will provide the epsilon-oxycarproyl unit with a least one dicarboxylic acid or its corresponding anhydride and at least two straight chain glycols of the formula $HO(CH_2)_nOH$ where n is an integer of 2 to 5, the proportions of the reactants being such that the resultant polyester has the required content of epsilon-oxycaproyl units. The polyesters thus produced after acylation are stated to be suitable for use as plasticisers for vinyl resins.

In British Patent Specification No. 1,137,882 there is claimed a process for the manufacture of polyesters which comprises reacting a mixture of the following components:

(a) between 10 mole % and 65 mole % of ε-caprolactone, (b) between 45 mole % and 17.5 mole % of an aliphatic dihydroxy compound, or of a mixture of two or more such compounds, and (c) between 45 mole % and 17.5 mole % of an aliphatic dicarboxylic acid, or of a mixture of two or more such acids, or of a mixture of one or more such acids with a proportion not exceeding 10 mole % of the total acids used of an aromatic dicarboxylic acid, the proportions of the components (a), (b) and (c) of the reaction mixture being further selected, within the limits defined above, according to the nature of the individual compounds constituting components (b) and (c) in such a way that the overall ratio of carbon to oxygen atoms in the polyester obtained excluding from consideration the oxygen atoms present in the terminal groups, is at least 4.5:2, provided that when component (b) consists of a single aliphatic α,ω-dihydroxy compound and component (c) consists of a single aliphatic α,ω-dicarboxylic acid, at least one of components (b) and (c) is a compound in which the main chain carbon atoms carry one or more substituent groups which are lower alkyl groups having from 1 to 4 carbon atoms. The polyesters thus produced are stated to be useful as plasticisers for vinyl chloride resins.

British Patent Specification No. 859,642 describes polyesters derived from lactones with at least one terminal hydroxyl group as being useful as plasticisers for vinyl halide and other resins. The polymerisation is initiated by such compounds as primary alcohols, diols containing from 2 to 10 carbon atoms and dicarboxylic acids such as phthalic acid, isophthalic acid and terephthalic acid. It is also stated that when the polyesters are to be used as plasticisers, the molecular weight may range between about 1500 and about 9000 and that optimum plasticising characteristics are obtained with polyesters having molecular weights between about 2000 and about 4000.

Surprisingly, we have found that a group of acid terminated polyesters having a molecular weight of 500 to 1400 incorporating a lactone as co-reactant with an aromatic, or a partially or fully hydrogenated aromatic dicarboxylic acid and an aliphatic diol are valuable plasticisers for polyvinyl chloride which have improved efficiency when compared with plasticisers from similar reactants of higher molecular weight described in BP. 859,642 and improved ease of processing and other valuable properties when compared with other commercially available polyester plasticisers. The molecular weight of the polyesters described in the present invention is determined by two factors:

(1) the ratio

$$\frac{\text{number of moles of monocarboxylic acid reactant}}{\text{number of moles of dicarboxylic acid reactant}} = R$$

(2) the mole % of the lactone used = C

Decreasing R for a given value of C, increases the molecular weight and vice versa.

Increasing C for a given value of R increases the molecular weight and vice versa.

According to the present invention there is provided a compound having the formula:

$$M(P)_a(D)_b(L)_cM \qquad I$$

in which M is the residue of one or more aliphatic monocarboxylic acids containing from 4 to 18 carbon atoms, P is the residue of one or more saturated straight or branched chain aliphatic diols containing from 2 to 6 carbon atoms, D is the residue of one or more unsubstituted or substituted aromtic dicarboxylic acids which may be partially or fully hydrogenated containing from 8 to 16 carbon atoms, L is the residue of one or more saturated hydroxy acids containing from 6 to 12 carbon atoms, each of the residues being joined together by ester linkages, residues P, D and L being distributed at random throughout the molecule, a, b and c each having a value greater than 0, the amount of residue of hydroxy acid being from 10 mole % to 90 mole % based on the total number of moles of reactants and the molar ratios of the remaining reactants being chosen so that the average molecular weight of the product is from 500 to 1400. Liquid polyesters are preferred since on the commercial scale they are much easier to handle and process than solid polyesters.

The average molecular weight is preferably from 600 to 1000. The residue of the hydroxy-acid is preferably derived from the corresponding lactone, but could be derived from the hydroxy-acid itself.

The monocarboxylic acid corresponding to residue M preferably contains from 6 to 12 carbon atoms, especially from 8 to 10 carbons atoms. The acid may be, for example, caproic, caprylic, 2-ethylhexoic, isooctanoic, capric, lauric, myristic, palmitic, coconut oil fatty acid, a mixture of monocarboxylic acids derived from oxidation of a hydrocarbon feedstock, or any mixture of the above acids.

The diol corresponding to residue P preferably contains from 2 to 4 carbon atoms.

The chain may, if desired, be interrupted by an oxygen atom as in diethylene glycol. Examples of these preferred diols are ethylene glycol; diethylene glycol; propane-1,2-diol; butane-1,3 diol; 2,2-dimethylpropane-1,3-diol; butane-1,4-diol; pentane-1,5-diol; hexane-1,6-diol; and di-propylene glycol.

The residue D is preferably an ortho- or meta-compound and the dicarboxylic acid or anhydride corresponding to residue D may, if desired, be substituted with from 1 to 4 alkyl groups containing from 1 to 4 carbon atoms.

The dicarboxylic acid or anhydride preferably contains 8 carbon atoms and may be isophthalic acid, but o-phthalic acid or phthalic anhydride is particularly preferred.

The lactone corresponding to residue L may, if desired, be substituted with one or more alkyl groups containing up to 4 carbon atoms for example, methyl. Examples of lactones are zeta-enantholactone, eta-caprylolactone, and lambda-laurolactone. However, lactones having 6 ring carbon atoms are more preferred, and $\epsilon$-caprolactone itself is most preferred.

When the lactone corresponding to the residue L is epsilon-caprolactone, the amount of $\epsilon$-caprolactone is preferably 20 mole % to 70 mole %, especially valuable polyesters being obtained when the amount of $\epsilon$-caprolactone is from 30 mole % to 50 mole %.

The present invention also provides a process for the manufacture of polyesters of formula I which comprises reacting a mixture of the following components (a) from 10 to 90 mole % of a lactone containing from 6 to 12 carbon atoms (b) a hydroxylic component which comprises one or more saturated straight or branched chain aliphatic diols containing from 2 to 6 carbon atoms (c) an acidic component which comprises one or more aromatic or partially or fully hydrogenated aromatic dicarboxylic acids or anhydrides containing from 8 to 16 carbon atoms and (d) one or more aliphatic monocarboxylic acids containing from 4 to 18 carbon atoms, such that the hydroxylic component is used in stoichiometric amount or up to 20% excess over the stoichiometric amount related to the acidic components. The amount of lactone and the ratios of the remaining reactants are chosen so that the average molecular weight of the product is from 500 to 1400.

The process for the manufacture of the polyesters of formula I may be carried out by conventional methods for the manufacture of polyesters prepared solely from dihydroxy compounds and dicarboxylic acids. For example the reaction mixture may conveniently be heated from 100° C. to 250° C. under conditions such that the water resulting from the condensation reaction is removed as it is formed, for example by passing a current of inert gas through the heated reaction mixture or by conducting the reaction in the presence of a suitable inert solvent such as xylene, with which the water may be removed by distillation as an azeotrope. Preferably the reaction is continued until the proportion of carboxylic acid end groups in the resulting polyester corresponds to an acid value of not more than 10 milligrams and especially not more than 5 milligrams potassium hydroxide per gram.

If desired a catalyst commonly used in polyester formation may be added to the reaction mixture for example strong acids such as sulphuric acid, phosphoric acid, p-toluene sulphonic acid, Lewis acids such as stannic acid, zinc chloride, aluminium chloride and metal salts and metal derivatives such as metal alkoxides for example tetrabutyl titanate, zinc adipate, antimony oxide and organo-tin compounds especially dibutyl tin oxide. The amount of catalyst used may be from 0.001% to 5% by weight based on the total weight of the reaction mixture. If desired up to 1% by weight of activated carbon based on the total weight of the reaction mixture may be added either to the reaction mixture or just before the filtration stage to preserve the colour of the product.

The polyesters of the present invention which may be used in amounts up to 60% by weight of the plasticised composition are efficient, easily processed plasticisers with good extraction resistance. They show an improvement in permanence in PVC without loss of efficiency when compared with conventional non-polymeric plasticisers. In fact, the polyesters of the present invention show a remarkable combination of properties not present in conventional non-migratory plasticisers: not only do they possess resistance to extraction and migration but they overcome the major defect of plasticisers of this type since they can be readily processed at temperature commonly used for monomeric plasticisers. The polyesters of the present invention may be incorporated into thermoplastic polymers such as polyvinyl chloride or its copolymers by conventional methods. If desired other conventional additives may be present in the thermoplastic composition such as heat and light stabilisers, antioxidants, fillers, pigments, lubricants, processing acids, and other plasticisers.

Examples of heat and light stabilisers are as follows:

(1) Salts of inorganic or organic acids containing metals such as aluminium, barium, bismuth, calcium, cadmium, potassium, lithium, magnesium, sodium, lead, antimony, tin, strontium or zinc or any metal which is capable of exerting a stabilising effect on PVC in salt form. The salts may be simple or complex.

Examples of inorganic salts are basic lead carbonate and tribasic lead sulphate.

Organic acids which may be used are:

(a) Aliphatic carboxylic acids, straight or branched chain unsaturated or saturated, and optionally containing hydroxyl substituents or oxygen in epoxy groups.

Examples are zinc 2-ethyl hexanoate, barium laurate and stannous octanoate.

(b) Aromatic mono- or di-carboxylic acids containing any type of substitution in the aromatic groups and any type of alkyl/aryl configuration.

Examples are cadmium p-tertiary butyl benzoate, calcium benzoate or lead salicylate.

(c) As acidic materials, phenols capable of forming stable compounds, (phenates) with metals whether in a suitable solution or not.

An example of such a compound is barium nonyl phenate.

(2) Organo-metallic compounds of any of the following metals, aluminium, barium, bismuth, calcium, cadmium, potassium, lithium, magnesium, sodium, lead, antimony, zinc, tin or strontium.

Examples of such compounds are dialkyl tin mercaptides and dialkyl tin carboxylates.

(3) Organic compounds of any description which prevent degradation of PVC.

Among these are $\alpha$-phenyl indole or esters of amino crotonic acid.

All these compounds may be used alone or as mixtures with each other either as solids or as solutions in any suitable solvent not necessarily being a stabiliser.

Combinations which may be used are of calcium and zinc carboxylates or of a barium phenate with the cadmium salt of a branched chain fatty acid or of barium, cadmium and zinc carboxylates.

There may be used with the foregoing stabilisers, materials which enhance the effectiveness of the stabilisers but which are not stabilisers for PVC when used alone. These are referred to as co-stabilisers and include (a) Epoxidised oils and esters such as epoxidised soya bean oil or epoxidised octyl oleate (b) Esters of phosphorous acid which may be trialkyl, triaryl, or alkyl-aryl. For example triphenyl phosphite, tris (nonyl phenyl) phosphite or diphenyl isodecylphosphite (c) Aliphatic hydrophilic compounds such as pentaerythritol neopentyl glycol, sorbitol or partial esters of glycerol (d) Phenolic compounds such as 2:6-di-tert-butyl 4-methyl phenol, or 2:2 bis(4'-hydroxy phenyl)propane.

These co-stabilisers can be used singly or together with the main stabiliser in any proportions and combinations. They may be applied in their natural state, alone or in mixtures of stabilisers, or in solvent solutions, alone or in admixture with the stabilisers, using suitable solvents which are not necessarily PVC stabilisers.

They may also be used in admixture with lubricants such as polyethylene waxes, ester waxes, stearic acid, calcium stearate, lead stearate, fillers such as calcium carbonate ground or precipitated or china clays.

They may also be used with materials which absorb ultraviolet light, making the PVC compound more stable to light exposure, for example benzophenones or benzotriazoles.

They may also be used in admixture with other known plasticisers which may be:

(a) Flame retardant such as triarylphosphates, alkyl diaryl phosphates (b) Phthalate esters (c) Low temperature plasticisers such as adipate, sebacate and azelate esters (d) Conventional polyester plasticisers such as poly(1:3 butylene glycol adipate) end-stopped with a $C_8$ alcohol or other typical members of this class.

(e) Aryl esters of alkane sulphonic acids (f) Extenders comprising halogenated paraffins or aromatic hydrocarbons.

The following Examples further illustrate the present invention.

EXAMPLES 1 TO 3

A 2 liter four necked round bottom flask was fitted with a stirrer in a ground glass stirrer gland, a 0°-250° C. contact thermometer in a thermometer pocket, and a nitrogen inlet. The flask was also fitted with a vacuum jacketed Vigreux column (6 inch effective length), surmounted by a water separator provided with a water-cooled condenser. The amounts of the reactants specified in Table I were charged to the flask together with 10–15% by weight on the theoretical yield of poly-ester of xylene and 0.1% by weight based on the theoretical yield of polyester of dibutyl tin oxide. Activated carbon in an amount 1% by weight based on the theoretical yield of ester was added to the reaction mixture in order to preserve the colour of the product.

The reactants were then heated up to approximately 200° C. over 8 hours with stirring, and this temperature maintained for a further 20, 12 and 20 hours respectively. A slow stream of nitrogen was passed into the reaction flask throughout the reaction. Water formed in the reaction was separated from the xylene in the water separator. When the acid value of the reaction mixture had reached the value given in Table 1, the solvent was removed by heating the reaction mass under reduced pressure. The mixture was finally vacuum stripped at 200° C. for one hour at 20 millimeters mercury pressure. The product was filtered in a pressure filter under nitrogen and was obtained as a clear liquid. The yields and properties of these polyesters are given in Table 1.

COMPARATIVE EXAMPLES A AND B

These polyesters were prepared in a similar manner to that described in British Patent Specification 859,642 in which phthalic anhydride, epsilon-caprolactone and ethylene glycol in the amounts specified in Table 1 together with 0.1% by weight based on the theoretical yield of polyester of tetrabutyl titanate, were heated to 160° C. under nitrogen until the water of condensation ceased to distil off. The reactants were then kept at the same temperature for another 24 hours and then subjected to a vacuum of 20 millimeters for 3.5 hours, still at the same temperature. The yields and properties are given in Table 1. These polyesters are outside the scope of the present invention because they are not acid endstopped: also the molecular weight of the polyester of Comparative Example B is outside the range of 500 to 1400 applicable to this invention.

COMPARATIVE EXAMPLES C AND D

Polyesters C and D were prepared by heating the polyesters prepared in Comparative Examples A and B respectively with acetic anhydride in the amounts specified in Table 1 for 5 hours at 100° C., followed by vacuum stripping for 2 hours at 200° C. and 1.0 millimeter mercury pressure. The yields and properties of these acetylated polyesters are given in Table 1. These polyesters are also outside the scope of the present invention because they are end-stopped by acetyl groups, whereas the monocarboxylic acids in the polyesters of this invention contain from 4 to 18 carbon atoms: also the molecular weight of the polyester of Comparative Example D is outside the range of 500 to 1400 applicable to this invention.

TABLE I

| Example | Phthalic Anhydride | Ethylene glycol | Mono-carboxylic acid | ε-caprolactone | Yield (grams) | Acid value mg KOH/g | Hydroxyl Value mg KOH/g | Viscosity Centistokes at 25° C | %weight/weight diester | Molecular weight |
|---|---|---|---|---|---|---|---|---|---|---|
| 1 | 148 [9.94] | 136 [21.87] | isooctanoic 288 [19.88] | 544 [48.31] | 1008 | 4.7 | 2.5 | 787 | 3.0 | 879 |
| 2 | 296 [14.7] | 214 [25.4] | isooctanoic 288 [14.7] | 698 [45.1] | 1325 | 5.4 | 2.9 | 3018 | 2.0 | 1043 |
| | 148 | 122 | isooctanoic 219 | 218 | | | | | | |

TABLE I-continued

| Example | REACTANTS (grams) [mol. %] Phthalic Anhydride | Ethylene glycol | Mono-carboxylic acid | ε-capro-lactone | Yield (grams) | Acid value mg KOH/g | Hydroxyl Value mg KOH/g | Viscosity Centi-stokes at 25° C | %weight/weight diester | Molecular weight |
|---|---|---|---|---|---|---|---|---|---|---|
| 3 | 296 [15.7] | 186 [30.9] | [23.5] | 288 [29.9] | 585 | 1.7 | 6.0 | 860.8 | 6.0 | 771 |
| A | [26.6] | [39.8] | — | [33.6] | 674 | 0.6 | 139 | 19920 | — | 802* (calculated from acid value & hydroxyl value) |
| B | 592 [31.2] | 298 [37.5] | — | 456 [31.2] | 1184 | 0.35 | 52 | too high to measure | — | 2141* (calculated from acid value & hydroxyl value) |
| C | 312g. 332g. | polyester A acetylated with acetic anhydride (=4 × theoretical amount) | | | 330 | 1.2 | −2.0 | 15979 | <2.0 | 1028 |
| D | 595g. 237g. | polyester B acetylated with acetic anhydride (=4 × theoretical amount) | | | 619 | 0.9 | −1.0 | >400,000 | <2.0 | 1751 |

*Number average molecular weight

Number average molecular weight = $\dfrac{112,000}{[\text{acid value} + \text{hydroxyl value (in mg KOH/g)}]}$ The viscosities of the polyesters of Comparative Examples B and D are so high that they are difficult to handle and process as plasticisers.

EXAMPLES 4 TO 6

The compositions of Examples 4 to 6 were obtained by incorporating 35 parts of the polyesters of Examples 1 to 3 respectively into 65 parts of polyvinyl chloride (Breon S 125/12), 4 parts of white lead paste and 1 part calcium stearate. The premix was compounded on a two roll mill at 165° C. for 15 minutes, and compression moulded at 180° C. for 5 minutes. The physical properties are given in Table 2.

COMPARATIVE EXAMPLES E, F AND G

The compositions of Comparative Examples E, F and G were obtained by incorporating 35 parts of the polyesters of Comparative Examples B, C and D respectively into 65 parts of polyvinyl chloride (Breon S125/12), 4 parts of white lead paste and 1 part calcium stearate. The premix was compounded on a two roll mill at 165° C. for 15 minutes, and compression moulded at 180° C. for 5 minutes. The physical properties are given in Table 2.

The physical properties of the compositions of Examples 4 to 6 and Comparative Examples E, F and G were determined by the following methods:

(a) International Rubber Hardness Degrees (IRHD) tested to BS 903 part A7 at 23° C.

(b) Cold Flex (Clash & Berg) was determined according to BS 2782 method 104B.

(c) Clear Point — The temperature at which a few particles of PVC heated in an excess of plasticiser and observed at a magnification of ×100 with a microscope are no longer discernible. The test indicates the relative processability of formulations containing differing plasticisers. In general the lower the clear point the easier the processing of the formulation.

TABLE 2

| Example | IRHD (54 phr.) | Clash and Berg (° C) | Clear Point (° C) |
|---|---|---|---|
| 4 | 84 | −8.0 | 125 |
| 5 | 90 | 0 | 127 |
| 6 | 87 | −1 | 129 |
| E | could not be mixed with PVC on a roll mill | | >200 |
| F | 99 | +12 | 136/145 |
| G | 99.5 | +22 | 170 |

The polyesters of the present invention present in the compositions of Examples 4 to 6 have good properties as PVC plasticisers with acceptable efficiency and Clash and Berg values, and low clear points. In contrast the polyesters outside the scope of this invention present in the compositions of Comparative Examples E, F and G have very poor plasticiser efficiency. This is illustrated by the fact that the polyester present in the composition of Comparative Example E could not be milled with PVC to give a plastic sheet, and the IRHD values of F and G were 99 and 99.5 respectively. In addition, the polyesters present in Comparative Examples E, F, and G have high clear points, and those in comparative Examples F and G confer poor low temperature flexibility.

COMPARATIVE EXAMPLES H, J AND K

The clear points were measured of the polyesters of Examples 1 to 3 as well as of products sold under the Trade Names Plastolein 9506 (Unilever-Emery), Arbeflex 538 (Robinson Bros.) and Palamol 644 (BASF). The results are given in Table 3.

TABLE 3

| Example | Plasticiser | Clear Point |
|---|---|---|
| | Example 1 | 125° C |
| | Example 2 | 127° C |
| | Example 3 | 129° C |
| E | Plastolein 9506 | 144° C |
| F | Arbeflex 538 | 159° C |
| G | Palamol 644 | 155° C |

It should be noted that the large difference in clear point shown between the plasticisers in Table 3 clearly demonstrates the superior processability of the products of this invention. The unusually low value of the polyesters of Examples 1 to 3 means that PVC compound can be made from these plasticisers at lower temperatures and more quickly than is possible with commonly used migration resistant commercial plasticisers.

EXAMPLES 7 TO 14

By following a similar procedure to that described for Examples 1 to 3 and using similar molar ratios to those given in Table I for Examples 1 to 3 polyesters can be prepared from the reactants listed in Table IV.

TABLE 4

| Example No. | Monocarboxylic acid corresponding to residue M | Diol corresponding to residue P | Dicarboxylic acid corresponding to residue D | Lactone corresponding to residue L |
|---|---|---|---|---|
| 7 | caproic | 1,3-butylene glycol | isophthalic | ξ-caprolactone |
| 8 | 2-ethylhexanoic | 1,2-propylene glycol | phthalic anhydride | ξ-caprolactone |
| 9 | lauric | 1,3-butylene glycol | phthalic anhydride | ξ-caprolactone |
| 10 | caproic | di-ethylene glycol | phthalic anhydride | lambda lauro-lactone |
| 11 | capric | 2,2-di-methylpropane-1,3-diol | phthalic anhydride | ξ-caprolactone |
| 12 | isooctanoic | 1,2-propylene glycol | hexa-hydro-phthalic anhydride | ξ-caprolactone |
| 13 | coconut oil fatty acids* | 1,3-butylene glycol | isophthalic acid | ξ-caprolactone |
| 14 | isooctanoic | pentane-1,5-diol | phthalic anhydride | ξ-caprolactone |

*A typical composition (in weight per cent) is as follows:- caprylic (8.0), capric (7.0), lauric (46) myristic (18), palmitic (10), stearic acid (11)

What I claim is:

1. A compound having the formula

$$M(P)_a(D)_b(L)_cM \qquad (I)$$

in which M is the residue of one or more aliphatic monocarboxylic acids containing from 4 to 18 carbon atoms, P is the residue of one or more saturated straight or branched chain aliphatic diols containing from 2 to 6 carbon atoms, D is the residue of one or more acids or anhydrides selected from the group consisting of o-phthalic acid, phthalic anhydride, isophthalic acid, hexahydrophthalic acid, hexahydrophthalic anhydride and any of the aforementioned acids or anhydrides substituted with 1 to 4 alkyl groups, said alkyl groups containing 1 to 4 carbon atoms, L is the residue of one or more saturated hydroxy acids containing from 6 to 12 carbon atoms, each of the residues being joined together by ester linkages, residues, P, D and L being distributed at random throughout the molecule, a, b and c each having a value greater than 0, the amount of residue of hydroxy acid being from 10 mole % to 90 mole % based on the total number of moles of reactants and the molar ratios of the remaining reactants being chosen so that the average molecular weight of the product is from 500 to 1400, which is prepared by reacting in one step a mixture of the following components (a) from 10 to 90 mol % of lactone or hydroxy acid containing from 6 to 12 carbon atoms, (b) a hydroxylic component which comprises one or more saturated straight or branched chain aliphatic diols containing from 2 to 6 carbon atoms, (c) an acidic component which comprises one or more acids or anhydrides selected from the group consisting of o-phthalic acid, phthalic anhydride, isophthalic acid, hexahydrophthalic acid, hexahydrophthalic anhydride and any of the aforementioned acids or anhydrides substituted with 1 to 4 alkyl groups, said alkyl groups containing 1 to 4 carbon atoms, and (d) one or more aliphatic monocarboxylic acids containing from 4 to 18 carbon atoms, such that the hydroxylic component is used in stoichiometric amounts or up to 20% excess over the stoichiometric amounts related to the acidic components.

2. A compound as claimed in claim 1 in which the residue of the hydroxy-acid is derived from the corresponding lactone.

3. A compound as claimed in claim 1 in which component M contains from 6 to 12 carbon atoms.

4. A compound as claimed in claim 3 in which component M contains from 8 to 10 carbon atoms.

5. A compound as claimed in claim 4 in which the monocarboxylic acid corresponding to residue M is isooctanoic acid.

6. A compound as claimed in claim 1 in which the diol corresponding to residue P contains from 2 to 4 carbon atoms.

7. A compound as claimed in claim 6 in which the diol corresponding to residue P is ethylene glycol.

8. A compound according to claim 1 in which the acid or anhydride corresponding to residue D is selected from the group consisting of o-phthalic acid, phthalic anhydride, isophthalic acid and any of the aforementioned acids or anhydrides substituted with 1 to 4 alkyl groups, said alkyl groups containing 1 to 4 carbon atoms.

9. A compound as claimed in claim 8 in which the residue D is derived from phthalic anhydride or ortho phthalic acid.

10. A compound as claimed in claim 1 in which the residue L is derived from a lactone containing 6 ring carbon atoms.

11. A compound as claimed in claim 10 in which the residue L is derived from epsilon caprolactone.

12. A compound as claimed in claim 11 in which the amount of epsilon-caprolactone is from 20 mole % to 70 mole % based on the total number of moles of reactants.

13. A compound as claimed in claim 12 in which the amount of epsilon-caprolactone is from 30 mole % to 50 mole %.

14. A composition comprising (a) a thermoplastic polymer selected from the group consisting of the poly(vinyl chloride) and poly(vinyl chloride) copolymers and (b) a plasticizing amount up to 60% by weight of the plasticized composition of a compound according to claim 1.

* * * * *